Nov. 21, 1961 E. A. BLASHEWSKI 3,009,706

STYLI HOLDER FOR PHONOGRAPH PICKUP CARTRIDGES

Filed March 12, 1958

Inventor
Eugene A. Blashewski
Dalbert U. Shefte
Attorney 3,009,706
Patented Nov. 21, 1961

3,009,706
STYLI HOLDER FOR PHONOGRAPH PICKUP CARTRIDGES

Eugene A. Blashewski, Maywood, Ill., assignor to Jensen Industries, Inc., Forest Park, Ill., a corporation of Illinois Filed Mar. 12, 1958, Ser. No. 720,893
4 Claims. (Cl. 274—37)

This invention relates to phonograph pickup cartridges, and more particularly to an improved styli holder for pickup cartridges.

At present, the many commercial types of pickup cartridges of the mechanical-electrical transducer type require a driving connection between the stylus point and the transducer element in order to properly transmit the undulations or vibrations caused by the groove of the record from the point to the transducer element. In order to produce a high quality reproduction, the mechanical transmission must be accurate and therefore unencumbered by surrounding structure. This normally has required a rather complicated structure for mounting the stylus in driving relation to the transducer without affecting the compliance of the elements. The structures have been further complicated by providing a replaceable point mounting.

These present stylus holders normally add noticeably to the total mass supported by the stylus, resulting in considerable record wear, causing distortion of the mechanical transmission, and also interfering with the response. Further they add considerably to the cost of pickup cartridges.

The present invention provides a simply constructed styli holder which is easily attachable to a transducer element, and adds very little mass to the overall cartridge construction. Further, the styli holder of the present invention can be very easily and inexpensively formed so as to greatly reduce the total cost of the cartridge and the cost of the holder itself when sold as a replacement.

It is a general object of the present invention to provide a new and improved styli holder for a phonograph pickup cartridge.

Another object of the present invention is to provide a styli holder which is attached directly to the transducer element for direct transmission of undulations from the point to the transducer element.

A further object of the present invention is to provide a new and improved styli holder of comparatively low mass.

Still another object of the present invention is to provide a new and improved styli holder as described above, having a pair of points mounted thereon and mounted in a cartridge for rotation to present either point in engagement with a record groove.

A still further object of the present invention is to provide a styli holder which may be formed from a flat plate.

Other and further objects and advantages of the present invention will be apparent from the following description and drawings, in which.

Figure 1:
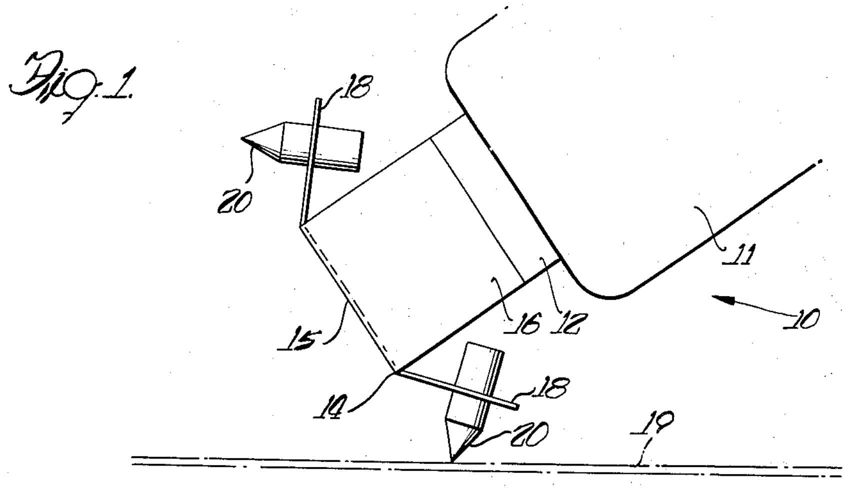
FIG. 1 is a side elevation view of the end portion of a phonograph pickup cartridge including a styli holder according to one embodiment of the present invention.
Figure 2:
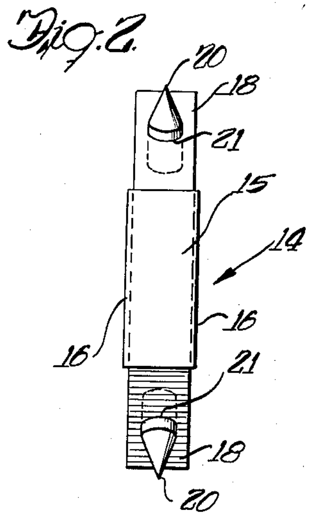
FIG. 2 is an oblique elevational view of the end of the styli holder of FIG. 1.

While this invention is susceptible of embodiments in many different forms, there is shown in the drawings and will herein be described in detail one embodiment, with the understanding that the present disclosure is to be considered as an exemplification of the principles of the invention, and is not intended to limit the invention to the embodiment illustrated. The scope of the invention will be pointed out in the appended claims.

Referring now to the drawings, the embodiment disclosed herein will be described in detail. A phonograph pickup cartridge indicated as 10 is partially shown in FIGURE 1. The details of the cartridge construction are not of importance at this time, as any of several commercially available cartridges can be utilized by modification to suit the purposes of this invention. The drawings show the outer end of the cartridge housing 11 in which a transducer 12 of rectangular cross section is mounted. The transducer extends outwardly from the housing 11 to receive the styli holder 14 described below. The transducer is of the mechanical-electrical type, such as a magnetic structure or a Piezoelectric crystal which receives mechanical undulations and transforms them into electrical impulses given off at the end of the transducer within the housing 11. The present invention is directed to the holder, in which the points are mounted and through which mechanical undulations are transmitted to the transducer.

The styli holder 14 shown in the drawings has a rectangular base 15 having dimensions similar to the cross section of the transducer 12 and upstanding sides 16 extending generally perpendicular to the base 15. These sides and the base form the clip-on attachment of U-shape for mounting the styli holder 14 on the transducer 12, as will be described below. Styli mounting arms 18 extend from both ends of the base 15 at acute angles with the base. The size of the angle depending on the relative position of the cartridge 10 with respect to a record 19 so that the proper operating angle is provided between the point 20 and the record. The points 20 are mounted in the styli mounting arms 18 as in holes 21 formed in the arms, the axis of each point being perpendicular to the plane of the arm in which it is mounted.

Figure 3:
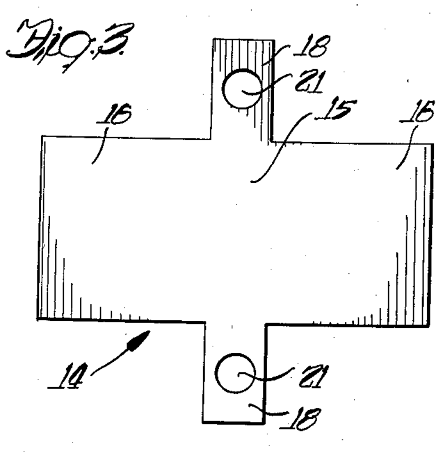
FIG. 3 is a plan view of a flat plate from which the styli holder of FIG. 1 is formed.

The styli holder 14 of this invention may be made of any suitable material, such as plastic or one of several metals. When made of plastic, it may be molded directly in the desired shape. In the embodiment illustrated, the styli holder 14 is formed from a metal such as beryllium copper, although aluminium, steel, or brass can be used with varying degrees of success. No effect in the quality of reproduction has been noted when using any of the above metals. When using metal, a distinct advantage over plastic or other material has been found in the fact that the styli holder may be formed from a single flat plate of desirable thickness which can be stamped to the configuration shown in FIGURE 3, wherein sides 16 and arms 18 are stamped to desired size while in the flat position. The holes 21 may be formed during the same stamping operation. The flat stamping of FIGURE 3 may then be placed in a jig for a single bending operation wherein the sides 16 are bent perpendicular to the base, and the arms 18 are bent at an acute angle to the base. The points 20 are then mounted in the holes 21 such as by a press fit or some other securing means. Any of various types of points may be utilized with this invention, such as metal, sapphires or diamonds. The holder 14 is then ready for mounting on the transducer 12. This mounting may be accomplished by crimping the sides 16 against the transducer 12 with the base 15 in contact with the end of the transducer. Another method of mounting would be to form the sides 16 so that they are bent slightly toward each other with their ends spaced a distance less than the thickness of the transducer element so that the holder can be clipped onto the transducer by spreading the ends. The release of the sides will then cause them to be spring urged toward each other and against the transducer so that they will be mounted thereon. Also, the mounting could be accomplished by cementing or by other types of bonding operations. When the holder is crimped or spring mounted, it can be easily removed for replacement when a point 20 is worn or broken.

The material from which the stylus holder is formed may be a low cost metal which requires only simple stamping and bending operations, thereby producing a very inexpensive and yet effective stylus holder.

The present invention also lends itself to simple and inexpensive replacement of points. Thus, when a point wears out or is broken, the holder can simply be removed by disengaging the sides 16 from the transducer 12 and mounting a new holder in its place. As the holders are inexpensive, the cost of the replacement is very little more than the cost of the points themselves.

One commercial holder embodying the structure of the present inveniton is formed from a flat beryllium copper plate of .006 inch thickness for mounting on a .030 inch by .075 inch transducer. The arms 18 extend a distance of .050 inch from the base 15 at an angle of 50° from the plane of the base. The sides 16 are of a height of .065 inch.

The present styli holder is especially adaptable for use in multi-speed phonographs since the points 20 may be of different construction so that each point is adapted for a different speed—the arms 18 being at an angle sufficient to provide a contact angle of approximately 75° between the record 19 and the point in contact therewith, the point being inclined at this angle toward the record in the direction of rotation of the record. As the cartridge is rotatable about its axis, the other point can easily be positioned for engagement with a record at the same or any other desirable angle.

Of course the styli holder of this invention is equally as adaptable for mounting single points. Thus, the holder can be formed with only one arm for use with a non-rotatable cartridge.

I claim as my invention:

1. A one-piece stylus holder adapted for use with a phonograph pickup having a downwardly projecting rectangular element, said holder comprising a clip-on attachment of U-shape with a rectangular base formed with substantially the same dimensions as, and adapted to lie against, the depending end of said element, integral laterally spaced parallel legs bent in the same direction away from the base and straddling and engaging parallel sides of said element to retain the holder on the element, and two arms formed integral with and bent away from the ends of said base in the same direction as said sides and projecting from the base between the sides and at an angle with respect to the base, said arms each receiving a stylus and supporting the same for engagement with a record disposed beneath the holder.

2. A stylus holder adapted for use with a phonograph pickup having a downwardly projecting rectangular element, said holder comprising a clip-on attachment of U-shape with a rectangular base formed with substantially the same dimensions as, and adapted to lie against, the depending end of said element, laterally spaced parallel legs bent in the same direction away from the base and straddling and engaging parallel sides of said element to retain the holder on the element, and at least one arm secured to and bent away from one end of said base in the same direction as said sides and projecting from the base between the sides and at an angle with respect to the base, said arm receiving a stylus and supporting the same for engagement with a record disposed beneath the holder.

3. A one-piece stylus holder adapted for use with a phonograph pickup having a downwardly projecting rectangular element, said holder comprising a clip-on attachment of U-shape with a rectangular base adapted to lie against the depnding end of said element, integral laterally spaced parallel legs bent in the same direction away from the base and straddling and engaging parallel sides of said element to retain the holder on the element, and two arms formed integral with and bent away from the ends of said base in the same direction as said sides and projecting from the base between the sides and at an angle with respect to the base, said arms each receiving a styus and supporting the same for engagement with a record disposed beneath the holder.

4. A one-piece stylus holder adapted for use with a phonograph pickup having a downwardly projecting rectangular element, said holder comprising a clip-on attachment of U-shape with a rectangular base adapted to lie against the depending end of said element, integral laterally spaced parallel legs bent in the same direction away from the base and straddling and engaging parallel sides of said element to retain the holder on the element, and at least one arm secured to and bent away from one end of said base in the same direction as said sides and projecting from the base between the sides and at an angle with respect to the base, said arm receiving a stylus and supporting the same for engagement with a record disposed beneath the holder.

References Cited in the file of this patent

UNITED STATES PATENTS

| | | |
|---|---|---|
| 2,363,497 | Begun | Nov. 28, 1944 |
| 2,596,494 | Lynch | May 13, 1952 |
| 2,749,131 | Kelly | June 5, 1956 |
| 2,768,245 | Palo | Oct. 23, 1956 |

FOREIGN PATENTS

| | | |
|---|---|---|
| 158,364 | Australia | Aug. 20, 1954 |
| 1,070,689 | France | Aug. 5, 1954 |